United States Patent
Wagle et al.

(10) Patent No.: US 6,997,841 B2
(45) Date of Patent: Feb. 14, 2006

(54) LUBRICATION PUMP FOR INTER-AXLE DIFFERENTIAL

(75) Inventors: Lawrence P. Wagle, Fulton, MI (US);
Dale Kwasniewski, Galesburg, MI (US); James F. Ziech, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/935,308

(22) Filed: Sep. 8, 2004

(65) Prior Publication Data
US 2005/0032602 A1    Feb. 10, 2005

Related U.S. Application Data

(63) Continuation of application No. 09/761,724, filed on Jan. 18, 2001, now Pat. No. 6,855,083.

(51) Int. Cl.
*F16H 57/04*    (2006.01)

(52) U.S. Cl. ..................................... 475/160
(58) Field of Classification Search ............... 475/243, 475/160; 184/6.12
See application file for complete search history.

(56) References Cited

U.S. PATENT DOCUMENTS

| | | | |
|---|---|---|---|
| 2,861,477 A | 11/1958 | Mueller | |
| 3,040,600 A | 6/1962 | Mueller | |
| 3,393,583 A | 7/1968 | Mueller | |
| 3,550,724 A | 12/1970 | Vollmer | |
| 3,590,954 A | 7/1971 | Plantan | |
| 3,762,503 A | 10/1973 | Wilder et al. | 184/6.12 |
| 3,994,634 A * | 11/1976 | Riddle et al. | 184/6.12 |
| 4,733,578 A | 3/1988 | Glaze et al. | |
| 5,007,806 A * | 4/1991 | Bellis et al. | 417/360 |
| 5,302,158 A | 4/1994 | Kwasniewski | 475/160 |
| 5,702,319 A | 12/1997 | Baxter | 475/88 |
| 5,709,627 A | 1/1998 | Teraoka | 475/86 |
| 5,711,408 A * | 1/1998 | Dick | 192/85 R |
| 5,916,052 A | 6/1999 | Dick | 475/198 |
| 5,964,584 A | 10/1999 | Lorentz | 418/73 |
| 6,702,703 B1 * | 3/2004 | Gervais et al. | 475/160 |
| 2004/0266579 A1 * | 12/2004 | Ziech et al. | 475/220 |

FOREIGN PATENT DOCUMENTS

| | | |
|---|---|---|
| EP | 0 599 050 A1 | 6/1994 |
| JP | 6-193712 * | 7/1994 |
| JP | 06193712 | 7/1994 |
| JP | 06193713 | 7/1994 |

OTHER PUBLICATIONS

Parker, P., ed., Mcgraw-Hill Dictionary of Scientific and Technical Terms, 5th ed. New York, Mcgraw-Hill, 1994, p. 997, Ref. Q123.M34.

* cited by examiner

*Primary Examiner*—Sherry Estremsky
(74) *Attorney, Agent, or Firm*—Berenato, White & Stavish

(57) ABSTRACT

An inter-axle differential assembly comprises an input shaft, an output shaft arranged coaxially with respect to each other, differential gearing and a dedicated reversible lubrication pump disposed between the input and output shafts. The reversible gerotor type lubrication pump includes a rotor driven by the input shaft, and an impeller, both disposed within a pump body coupled to a side gear drivingly connected to the output shaft. Thus, the lubrication pump generates lubricant flow only during the differential action between the input shaft and the output shaft, i.e. only when needed and at a flow rate proportional to the speed difference across the differential assembly. An oil flow generated by the lubrication pump is supplied to various components of the inter-axle differential assembly through a gallery of fluid passages.

7 Claims, 5 Drawing Sheets

LUBRICATION PUMP FOR INTER-AXLE DIFFERENTIAL

CROSS-REFERENCE TO RELATED APPLICATION

This application is a continuation of application Ser. No. 09/761,724, filed on Jan. 18, 2001 now U.S. Pat. No. 6,855,083.

BACKGROUND OF THE INVENTION

1. Field of the Invention

The present invention relates broadly to inter-axle differential assemblies and, more particularly, to a dedicated lubrication pump for an inter-axle differential assembly.

2. Description of the Prior Art

Motor vehicles with solidly connected multiple drive axles are commonly equipped with an inter-axle differential assembly, commonly arranged in a vehicular transmission transfer case or tandem axle power divider to allow torque balance between the drive axles during the vehicle cornering, to compensate for tire size differences, etc., i.e. when there is any physical requirement for speed difference between the drive axles. The inter-axle differential assemblies are widely employed for tandem drive axles of heavy-duty trucks for on-and off-road service as a power divider.

These motor vehicles are, on occasion, driven in situations where there may be unequal traction conditions between the tires of the different drive axles. If the traction condition at any tire falls below that required for sufficient traction effort, high-speed inter-axle differential conditions may occur. These high-speed differential conditions may be potentially severely damaging to critical differential assembly components, such as shaft bearing surfaces as well as rolling contact surfaces of the differential assembly, due to lack of lubrication.

In such drive axles it is common to have a supply of lubricant in a transfer case or axle housing and to provide positive lubricant pressure to the input and output shaft journals and the inter-axle differential that are disposed above the level of lubricant in the housing to prevent damaging the differential gear components during these high speed differential conditions. However, current lubrication pumps for differential assemblies are driven continuously while the vehicle is in motion, although lubrication supply is only needed during occasional conditions of relatively high-speed levels of differential action as it is well known to those skilled in the art. The continuously driven lubrication pump operates and consumes engine power irrespective of the amount of lubrication needed by the shaft journals and other components of the inter-axle differential, thus causing unnecessary parasitic losses in a vehicle power transmission and increasing fuel consumption.

Thus it has been desired to provide a low-cost and convenient way to incorporate a lubricant pump for providing positive flow of lubricant to the shaft journals and the inter-axle differential assembly only as required.

SUMMARY OF THE INVENTION

The present invention alleviates the drawbacks of the prior art. The present invention provides an inter-axle differential assembly having a dedicated lubrication pump. The lubrication pump is drivingly coupled to two differentially rotating members of the differential assembly, and, thus, supplies lubricant only when differential action occurs. The hydraulic pump provides volumetric flow of lubricant that varies in direct proportion to the relative (or differential) rotational speed of the rotating members.

In accordance with the preferred embodiment of the present invention, the inter-axle differential assembly comprises an input shaft, an output shaft arranged coaxially with respect to each other, a differential gearing and the dedicated lubrication pump disposed between the input and output shafts. The lubrication pump is provided solely for the purpose of lubricating the shaft journals and the inter-axle differential gearing, and only when needed, i.e. the pump generates lubricant flow only during the differential action between the input shaft and the output shaft, and at a flow rate in proportion to the speed differential.

In accordance with the preferred embodiment of the present invention, the pump is of the gerotor type, and the differential is of the bevel gear type. However, other types of pumps, such as gear or vane type pumps, are within the scope of the present invention, as well as other types of differentials, such as the spur gear type. The lubrication pump includes a rotor driven by the input shaft, and a housing coupled to a side gear drivingly connected to the output shaft. An oil flow generated by the lubrication pump is supplied to the shaft journals and the inter-axle differential gearing through a gallery communicating with passages in the input and output shafts which supply lubricant to the journals for these shafts and to the inter-axle differential assembly.

Alternatively, the pump housing is coupled directly to the output shaft.

Therefore, the inter-axle differential assembly in accordance with the present invention includes the dedicated lubrication pump, compactly disposed between the input and output shafts, that lubricates the differential assembly components only when needed, thus providing better efficiency and lower fuel consumption.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
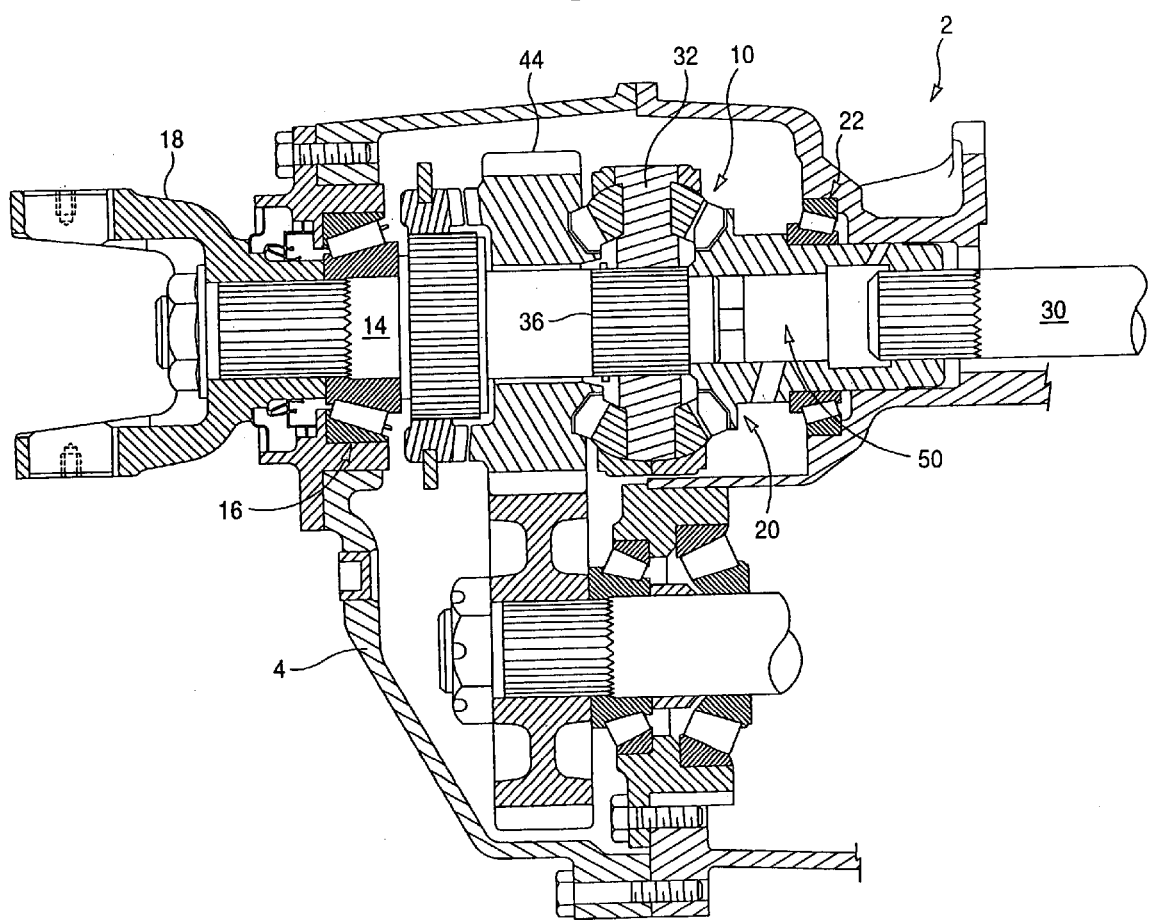
FIG. 1 is a longitudinal cross-sectional view of a tandem axle power divider that houses an inter-axle differential of the present invention.

Referring to FIG. 1, an inter-axle differential assembly 10 of the present invention disposed in a housing 4 of a tandem axle power divider indicated generally at 2, is illustrated. The housing 4 is ordinarily provided with a supply of lubricant, such as lubrication oil, therein.

Figure 2:
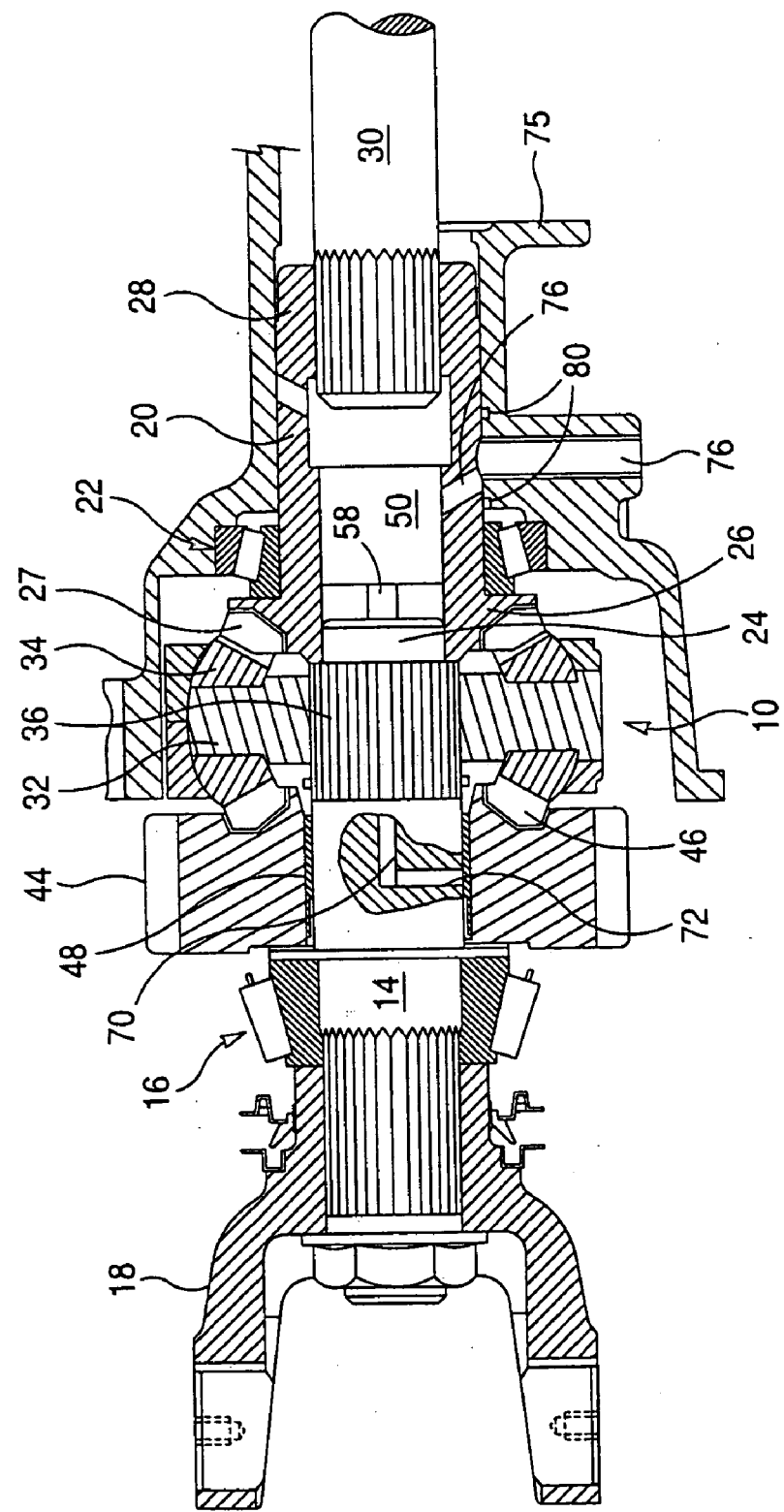
FIG. 2 is a longitudinal cross-sectional view of the inter-axle differential in accordance with the first embodiment of the present invention.

The inter-axle differential assembly 10 in accordance with the first embodiment of the present invention, illustrated in detail in FIG. 2, comprises an input shaft 14 rotatably supported in a bearing assembly indicated generally at 16, a differential spider 32 drivingly coupled to the input shaft 14 and provided with a plurality of pinion gears 34 rotatably mounted thereon, a first side gear 20 and a second side gear 44 meshing with the pinion gears 34, an output shaft 30 drivingly connected to the first side gear 20, and a dedicated lubrication pump 50 disposed between the input shaft 14 and the output shaft 30 and solely for the purpose of lubricating components of the inter-axle differential assembly 10 during the differential action between the input shaft 14 and the output shaft 30.

The input shaft 14 rotatably supported in a bearing assembly indicated generally at 16, and has a yoke 18 attached thereto, which is adapted for receiving torque from a vehicle driveline (not shown). The differential spider 32 drivingly engages the input shaft 14 by any appropriate means, preferably through a spline connection 36. Thus, input torque is transmitted directly to the differential spider 32. In most applications, the number of the pinion gears 34 will be four, but the number can be as low as two and can be higher than four, although most practical applications would probably not contain more than six pinion gears.

The first side gear 20 is journalled in a second bearing assembly indicated generally at 22, and has a reduced diameter pilot portion 24 of the input shaft 14 journalled therein. The first side gear 20 includes a flange portion 26 integrally formed with a sleeve portion 28. The flange portion 26 is provided with a plurality of side gear teeth 27 formed thereon for meshing with the pinion gears 34. The sleeve portion 28 of the first side gear 20 is drivingly coupled with the output shaft 30. An outboard end of the output shaft 30 is adapted for connection to the rear drive axle (not shown) of the motor vehicle.

The second side gear 44 is rotatably mounted to the input shaft 14 by a sleeve bearing or bushing 48 for free rotation thereon. It will be appreciated that any other appropriate type of bearings, such as needle bearings, are also applicable. The second side gear 44 has a plurality of gear teeth 46 thereon engaging the pinion gears 34.

A lubrication pump 50, in accordance with the first embodiment of the present invention, is disposed between the input shaft 14 and the output shaft 30 of the inter-axle differential 10 within the sleeve portion 28 of the first side gear 20. In the preferred embodiment, the lubrication pump 50 is a gerotor pump.

Figure 3:
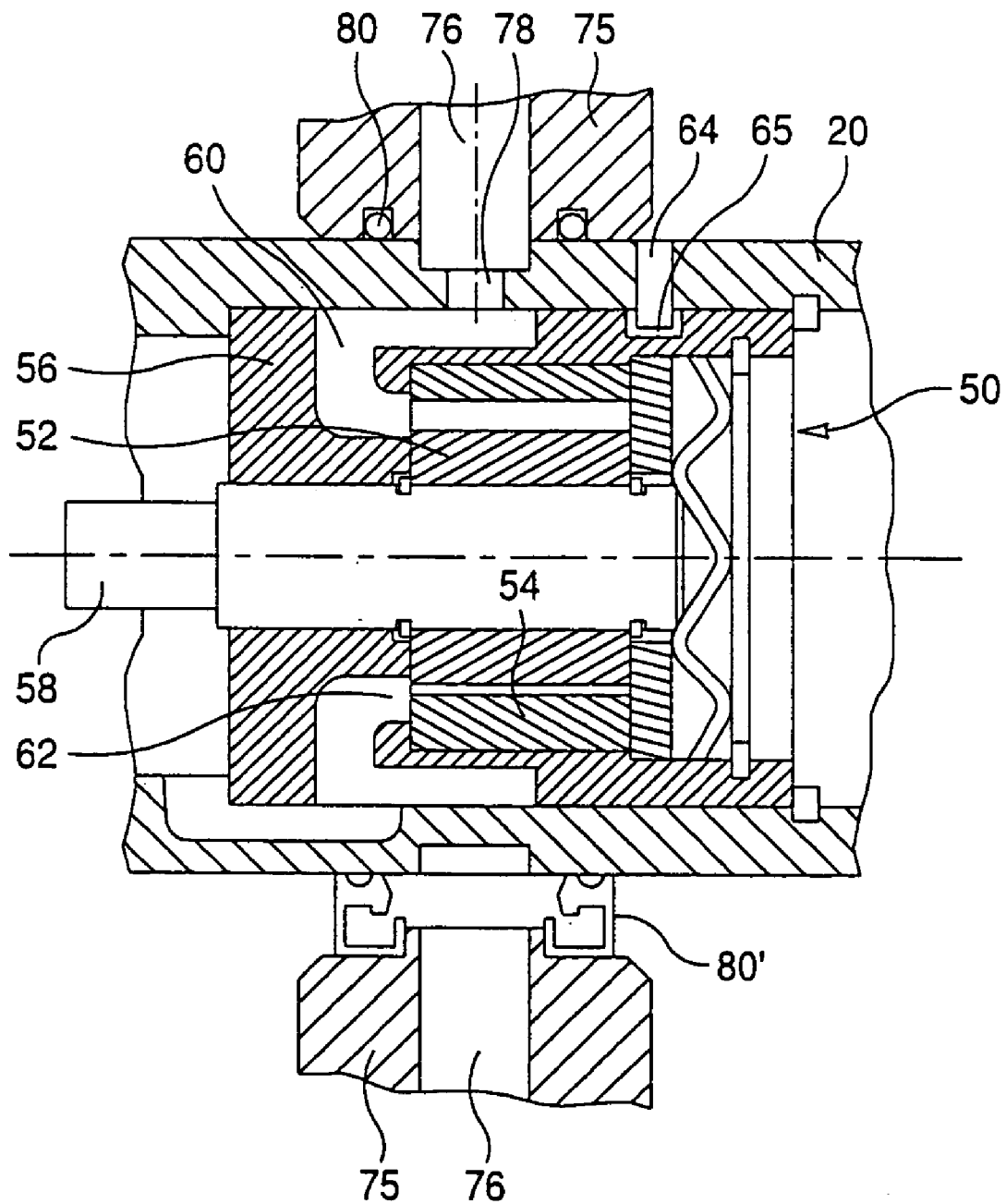
FIG. 3 is a longitudinal cross-sectional view of a portion of the inter-axle differential in accordance with the first embodiment of the present invention showing a preferred embodiment of a gerotor lubrication pump.

The reversible unidirectional flow gerotor pump 50, well known in the prior art and illustrated in detail in FIG. 3, comprises a rotor 52 having a plurality of external teeth, an impeller 54 having a plurality of internal teeth which are in meshing engagement with external teeth of the rotor 52, and a pump body 56 housing the rotor 52 and the impeller 54. The rotor 52 is eccentrically arranged relative to the impeller 54 and is drivingly connected to the input shaft 14 through a rotor shaft 58 having a substantially smaller diameter then the pilot portion 24 of the input shaft 14, as seen in FIG. 2. In general, the rotor 52 has one less tooth than the impeller 54, such that driving of the rotor 52 will in turn cause driving of the impeller 54. The pump body 56 is secured to the side gear 20 within its sleeve portion 28 by means of a pin 64 received in an arcuate groove 65 formed in the pump body 56. An inlet port 60 and an outlet port 62 are formed in the pump body 56. Relative rotation of the rotor 52 to the impeller 54 thus provides a series of variable volume chambers within pump 50, resulting in the build up of fluid pressure and pumping of lubricant in response to relative rotation of the rotor 52 and impeller 54, and thus in response to differential rotation between the input shaft 14 and the first side gear 20. Obviously, volumetric flow of lubricant produced by the lubrication pump varies in direct proportion to the differential rotational speed of the input and output shafts.

The pump body 56 is housed within the sleeve portion 28 of the first side gear 20 and located angularly by the pin 64 in the arcuate groove 65 formed in an outer peripheral surface of the pump body 56. The groove 65 extends angularly around 90° of the outer peripheral surface of the pump body 56. Consequently, the pump body 56 is allowed to rotate 90° relative to the first side gear 20 depending on a relative direction of rotation of the rotor 52 with respect to the first side gear 20. In this way, the pump body 56 exchanges positions of the inlet port 60 and the outlet port 62 relative to the first side gear 20 in order to provide a reversible pumping function. Thus, the switching of ports 60 and 62 allows the pump 50 to provide a unidirectional flow of lubricant regardless of the direction of the rotation of the rotor 52.

Referring again to FIGS. 2 and 3, the lubricant under pressure flows from the outlet port of the lubrication pump 50 (the second port 62 in FIG. 3) through a gallery of fluid passages including a passage 70 provided in the input shaft 14 to lubricate the components of the inter-axle differential 10 via a number of cross passages, such as a cross passage 72 for lubricating the sleeve bearing 48. Additionally, the inter-axle differential assembly 10 may have supplemental lubricant delivery means, such as a splash diversion and delivery channels (not shown).

The inlet port 60 of the pump 50 is in fluid communication with an inlet passage 76 provided in a differential support carrier 75, trough an inlet cross passage 78 in the sleeve portion 28 of the first side gear 20 between seal rings 80. Alternatively, as shown in a lower portion of FIG. 3, pair of annular lip seals 80' may be used to seal the inlet passage 76. The inlet passage 76 is in turn fluidly connected to the supply of lubricant disposed in the housing 4 of the tandem axle power divider 2, and may be fitted with a check valve (not shown) or an elevated oil reservoir (not shown) to aid in pump priming.

It will be appreciated that any other appropriate types of reversible unidirectional flow hydraulic pumps such as gear, vane or wobble pin type, well known in the prior art, are within the scope of the present invention.

Figure 4:
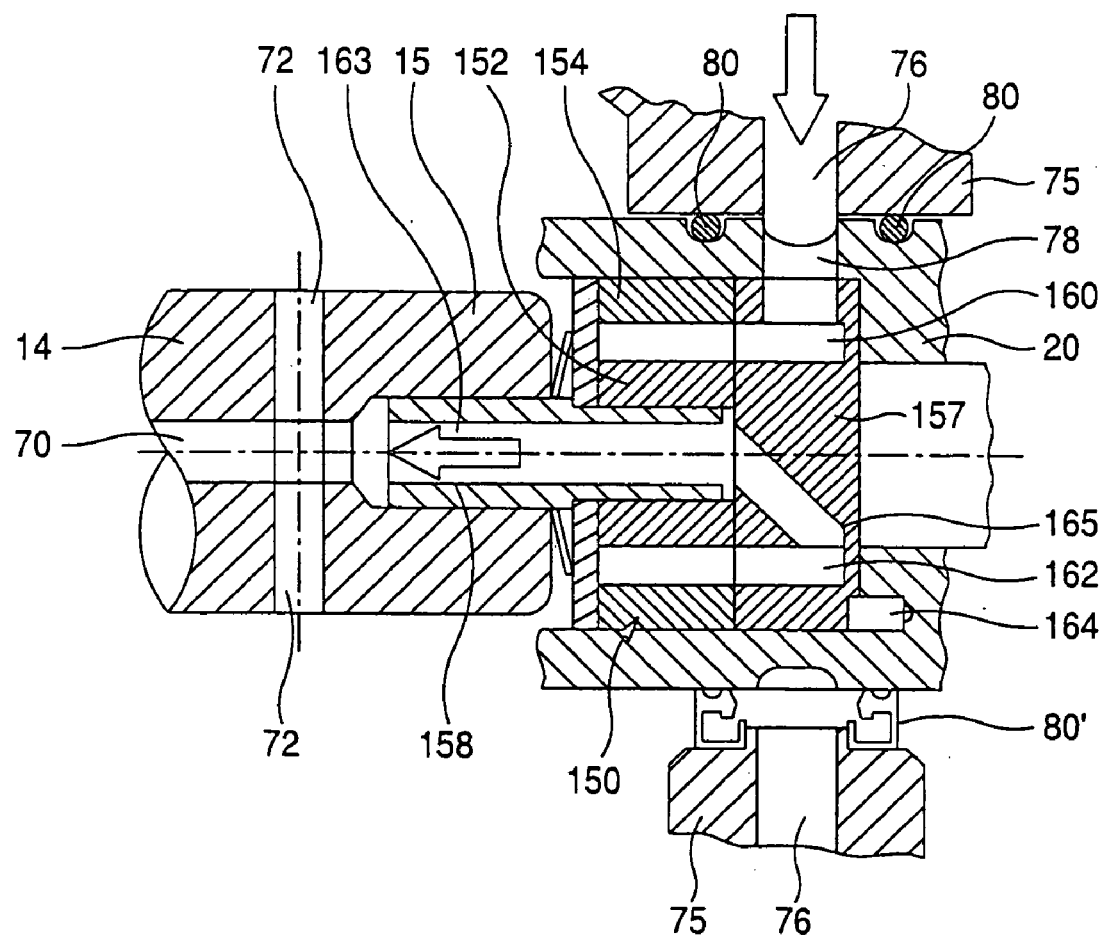
FIG. 4 is a longitudinal cross-sectional view of a portion of the inter-axle differential in accordance with the first embodiment of the present invention showing alternative embodiment of the gerotor lubrication pump.

FIG. 4 illustrates an alternative embodiment of the reversible gerotor lubrication pump used in the inter-axle differential assembly 10 in accordance with the first embodiment of the present invention. An inboard end 15 of the input shaft 14 is rotatably supported in the sleeve portion 28 of the first side gear 20. A dedicated lubrication pump 150, preferably a conventional gerotor pump of reversible unidirectional flow type, is disposed within the sleeve portion 28 of the first side gear 20 adjacent to the inboard end 15 of the input shaft 14. The lubrication gerotor pump 150 comprises a rotor 152, an impeller 154, and a port plate 157 having a first port 160 and a second port 162. The rotor 152 is drivingly connected to the input shaft 14 through a rotor shaft 158. An outlet passage 163 is formed within the tubular rotor shaft 158.

The lubricant under pressure flows from the outlet port 162 of the lubrication pump 150 through the passage 170 drilled in the input shaft 14 to lubricate the components of the inter-axle differential 10 via a number of cross passages, such as cross passages 72.

The port plate 157 is located angularly by a pin 164 in an arcuate groove 165 formed on an outer peripheral surface of the port plate 157. The groove 165 is angularly extended around an outer peripheral surface of the port plate 157 to approximately 180°. Consequently, the port plate 157 is allowed to rotate 180° relative to the first side gear 20 depending on a relative direction of rotation of the pump rotor 152 with respect to the first side gear 20. In this way, the port plate 157 exchanges positions of the inlet port 160 and the outlet port 162 relative to the first side gear 20 in order to provide a reversible pumping function. Thus, the switching of the ports 160 and 162 allows the pump 150 to provide a unidirectional flow of lubricant regardless of the direction of the rotation of the rotor 152.

The inlet port 160 of the pump 150 is in fluid communication with the inlet passage 76 provided in the differential support carrier 75, trough an inlet cross passage 78 in the sleeve portion 28 of the first side gear 20 between seal rings 80. Alternatively, as shown in a lower portion of the FIG. 4, pair of annular lip seals 80' may be used to seal the inlet passage 76. It will be appreciated that any other appropriate sealing device for sealing the inlet passage 76 is within the scope of the present invention. The inlet passage 76 is fluidly connected to the supply of lubricant disposed in the housing 4 of the tandem axle power divider 2, and may be fitted with a check valve (not shown) or an elevated oil reservoir (not shown) to aid in pump priming.

Figure 5:
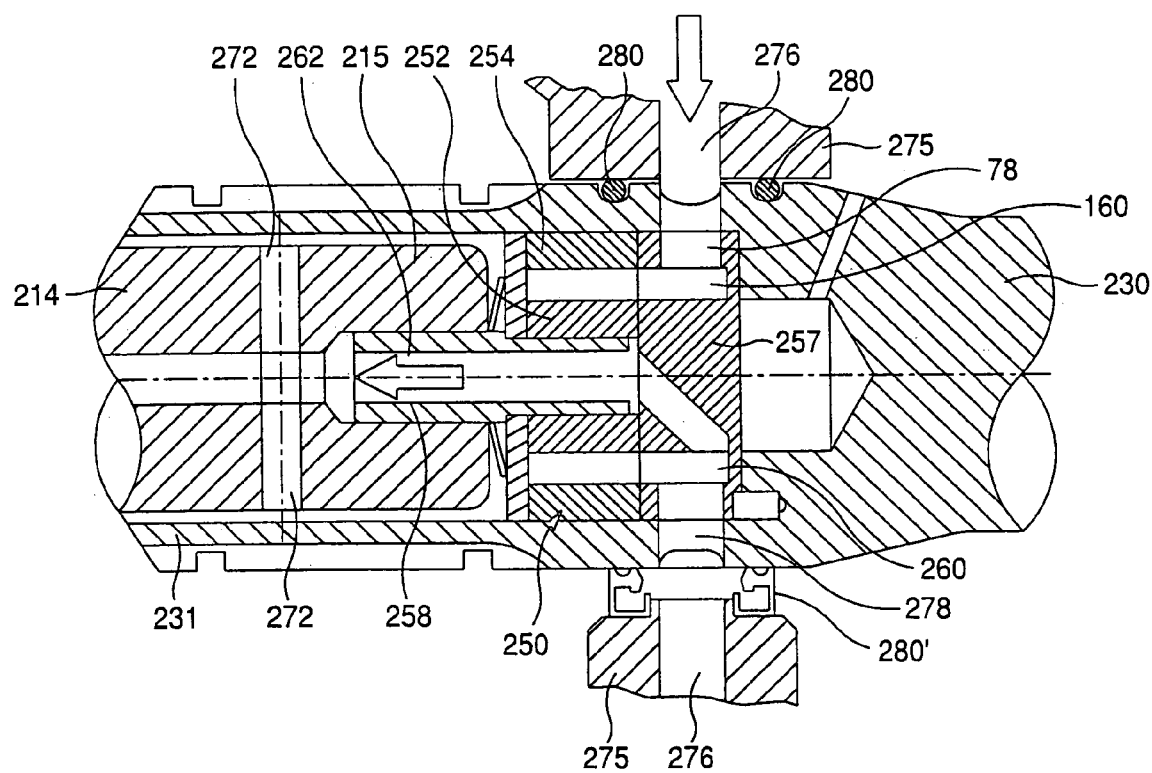
FIG. 5 is a longitudinal cross-sectional view of a portion of the inter-axle differential in accordance with the second embodiment of the present invention.

In accordance with the second embodiment of the present invention, illustrated in FIG. 5, an inboard end 215 of an input shaft 214 is rotatably supported in a tubular inboard end 231 of an output shaft 230. A dedicated lubrication pump 250, preferably of conventional reversible unidirectional gerotor type, is disposed within the tubular inboard end 231 of the output shaft 230 adjacent to the inboard end 215 of the input shaft 214. The lubrication gerotor pump 250 comprises a rotor 252, an impeller 254, and a port plate 257 having an inlet port 260. The rotor 252 is drivingly connected to the input shaft 214 through a rotor shaft 258. An outlet port 262 is provided as a passage within the tubular rotor shaft 258.

The lubricant under pressure flows from the outlet port 262 of the lubrication pump 250 through a passage 270 drilled in the input shaft 214 to lubricate the components of the inter-axle differential 10 via a number of cross passages, such as cross passages 272. The inlet port 260 of the pump 250 is in fluid communication with an inlet passage 276 provided in a differential support carrier 275, trough an inlet cross passage 178 in the tubular inboard end 231 of the output shaft 230 between seal rings 280. Alternatively, as shown in a lower portion of the FIG. 5, pair of annular lip seals 280' may be used to seal the inlet passage 276. It will be appreciated that any other appropriate sealing device for sealing the inlet passage 276 is within the scope of the present invention. The inlet passage 276 is fluidly connected to the supply of lubricant disposed in the housing 4 of the tandem axle power divider 2, and may be fitted with a check valve (not shown) or an elevated oil reservoir (not shown) to aid in pump priming.

Therefore, a novel arrangement of the inter-axle differential assembly in accordance with the present invention including the dedicated lubrication pump provides a compact, efficient and low-cost solution for lubricating components of the inter-axle differential assembly only when needed. The present arrangement of the inter-axle differential assembly substantially reduces parasitic losses associated with powering lubrication pumps.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An inter-axle differential assembly for a vehicular power transmission unit provided with a supply of lubricant, said inter-axle differential assembly comprising:
   a differential input shaft;
   a differential output shaft;
   a differential gearing, said a differential gearing including:
      a first side gear and a second side gear arranged coaxially relative to said input shaft and rotatable relative to said differential input shaft, said first side gear is drivingly coupled to said output shaft;
      a differential spider drivingly connected to said input shaft; and
      a plurality of pinion gears rotatably mounted to said differential spider and drivingly engaging said first side gear and said second side gear to allow differential rotation thereof;
   a dedicated lubrication pump for lubricating components of said differential assembly, said pump mounted between said input shaft and said output shaft, wherein said pump generates lubrication flow whenever differential action between said differential input shaft and said differential output shaft occurs, said lubrication pump including a rotor non-rotatably coupled to said input shaft and an impeller positioned within said first side gear, wherein said rotor is rotatably disposed within said impeller and is operative upon rotation with respect to said impeller;
   said lubrication pump being axially spaced from both said differential input shaft and said differential output shaft;
   a hydraulic fluid suction passage providing an inlet fluid communication passage between said supply of lubricant and an inlet port of said lubrication pump; and
   a gallery of fluid passages supplying said lubricant for lubricating said components of said inter-axle differential assembly; said gallery of fluid passages fluidly connected to an outlet port of said lubrication pump.

2. The inter-axle differential assembly as defined in claim 1, wherein said lubrication pump is a reversible unidirectional pump.

3. The inter-axle differential assembly as defined in claim 1, wherein said first side gear includes a sleeve portion receiving at one end thereof said input shaft rotatably mounted therein and said output shaft at the other end for drivingly coupling thereto, said sleeve portion of said first side gear houses said lubrication pump therewithin.

4. The inter-axle differential assembly as defined in claim 3, wherein said inlet fluid communication passage includes an inlet passage formed in said sleeve portion of said first side gear.

5. The inter-axle differential assembly as defined in claim 1, wherein said lubrication pump comprises a gerotor pump.

6. An inter-axle differential assembly for a vehicular power transmission unit provided with a supply of lubricant, said inter-axle differential assembly comprising:
   a differential input shaft;
   a differential output shaft;
   a differential gearing, said a differential gearing including:
      a first side gear and a second side gear arranged coaxially relative to said input shaft and rotatable relative to said differential input shaft, said first side gear is drivingly coupled to said output shaft;
      a differential spider drivingly connected to said input shaft; and
      a plurality of pinion gears rotatably mounted to said differential spider and drivingly engaging said first side gear and said second side gear to allow differential rotation thereof;
   a dedicated lubrication pump for lubricating components of said differential assembly, said pump mounted between said input shaft and said output shaft, wherein said pump generates lubrication flow whenever differential action between said differential input shaft and said differential output shaft occurs, said lubrication pump including a rotor non-rotatably coupled to said input shaft and an impeller positioned within said first side gear, wherein said rotor is rotatably disposed within said impeller and is operative upon rotation with respect to said impeller;
   a hydraulic fluid suction passage providing an inlet fluid communication passage between said supply of lubricant and an inlet port of said lubrication pump; and
   a gallery of fluid passages supplying said lubricant for lubricating said components of said inter-axle differential assembly; said gallery of fluid passages fluidly connected to an outlet port of said lubrication pump;
   said lubrication pump comprising a vane pump.

7. An inter-axle differential assembly for a vehicular power transmission unit provided with a supply of lubricant, said inter-axle differential assembly comprising:
   a differential input shaft;
   a differential output shaft;
   a differential gearing, said a differential gearing including:
      a first side gear and a second side gear arranged coaxially relative to said input shaft and rotatable relative to said differential input shaft, said first side gear is drivingly coupled to said output shaft;
      a differential spider drivingly connected to said input shaft; and
      a plurality of pinion gears rotatably mounted to said differential spider and drivingly engaging said first side gear and said second side gear to allow differential rotation thereof;
   a dedicated lubrication pump for lubricating components of said differential assembly, said pump mounted between said input shaft and said output shaft, wherein said pump generates lubrication flow whenever differential action between said differential input shaft and said differential output shaft occurs, said lubrication pump including a rotor non-rotatably coupled to said input shaft and an impeller positioned within said first side gear, wherein said rotor is rotatably disposed within said impeller and is operative upon rotation with respect to said impeller;
   said rotor of said lubrication pump being non-rotatably coupled to said differential input shaft through a rotor shaft extending between said input shaft and said rotor;
   a hydraulic fluid suction passage providing an inlet fluid communication passage between said supply of lubricant and an inlet port of said lubrication pump; and
   a gallery of fluid passages supplying said lubricant for lubricating said components of said inter-axle differential assembly; said gallery of fluid passages fluidly connected to an outlet port of said lubrication pump.

* * * * *